United States Patent [19]

Vache et al.

[11] Patent Number: 4,816,822

[45] Date of Patent: Mar. 28, 1989

[54] REMOTE ENVIRONMENTAL MONITOR SYSTEM

[75] Inventors: John P. Vache, Kirkland; Jerry E. Johnson, Bellevue, both of Wash.; Lon O. Hocker, N. Falmouth; John H. Godley, E. Falmouth, both of Mass.

[73] Assignee: Ryan Instruments, Inc., Redmond, Wash.

[21] Appl. No.: 829,803

[22] Filed: Feb. 14, 1986

[51] Int. Cl.$^4$ .............................................. H04Q 1/00
[52] U.S. Cl. ............................. 340/825.15; 361/384
[58] Field of Search ............. 340/501, 587, 584, 693, 340/825.15, 310 R; 374/100, 104, 163, 170; 364/707, 709; 375/62; 73/431; 323/909, 323, 283; 307/135, 140, 141, 141.4; 361/383, 384; 346/33 TP

[56] References Cited

U.S. PATENT DOCUMENTS

| | | | |
|---|---|---|---|
| 3,067,931 | 12/1962 | Mosse . | |
| 3,360,993 | 1/1968 | MacMillan . | |
| 3,407,869 | 10/1968 | Staunton | 361/383 X |
| 3,565,462 | 2/1971 | Gottlieb . | |
| 3,942,030 | 3/1976 | Olsen et al. | 340/584 |
| 4,135,400 | 6/1979 | Maxwell et al. | 346/33 TP X |
| 4,236,144 | 11/1980 | Sunagawa | 374/170 X |
| 4,259,648 | 3/1981 | Farrow | 375/62 X |
| 4,286,465 | 9/1981 | Thomae . | |
| 4,298,947 | 11/1981 | Tamura et al. . | |
| 4,324,138 | 4/1982 | Davis et al. . | |
| 4,359,747 | 11/1982 | Goldschmidt et al. . | |
| 4,368,439 | 1/1983 | Shibuya et al. | 375/62 X |
| 4,372,692 | 2/1983 | Thomae . | |
| 4,381,552 | 4/1983 | Nocilini et al. | 364/707 |
| 4,412,210 | 10/1983 | Washizuka et al. | 364/709 X |
| 4,422,066 | 12/1983 | Belcourt et al. | 340/501 X |
| 4,455,096 | 6/1984 | Brandstedt . | |

OTHER PUBLICATIONS

Electronics—"Tattletale Tells Temperature".

Primary Examiner—Ulysses Weldon
Attorney, Agent, or Firm—Seed and Berry

[57] ABSTRACT

An electronic measurement, data storage and readout system utilizing a programmable processor and controller to manipulate data measurements from a transducer is disclosed. Means are provided for electronically safeguarding the stored data. In the preferred embodiment means are also provided for reading out the data directly to a dedicated printer for producing graphical representations of the data and for converting the data to frequency-shift keyed signals which can be transmitted over telephone lines to the dedicated printer. A redeployment station is provided to reinitialize the programmable processor and controller.

16 Claims, 6 Drawing Sheets

REMOTE ENVIRONMENTAL MONITOR SYSTEM

TECHNICAL FIELD

This invention relates to an apparatus for measuring environmental conditions and for storing the measurements. Specifically, the invention relates to an electronic measurement, data storage and read-out system.

BACKGROUND OF THE INVENTION

Remote recorders have been available to record various environmental conditions. In one application, temperature recorders are available which can record environmental temperature over a specific time period and provide a readout of the measured temperature versus time.

Typically, such recorders have been of the chart recorder type. These recorders inscribe a graph of measured temperature versus time on a rolling strip chart. When the measurements are complete, the user can remove the inscribed script chart from the recorder unit and determine the temperature history of the recorder. This type of chart recorder has been used for measuring the temperature of cargo containers for fruits, vegetables and other temperature-sensitive produce. The recorder is usually placed with the produce to be shipped and retrieved at the end of the trip by the receiver. The recorder also typically includes some type of security mechanism to prevent the shipper from tampering with the recorder during transit.

Recorders of the type discussed above suffer from a number of disadvantages which have become well known to those in the industry. The recorder mechanism itself can be unreliable in that a number of moving parts are required to operate the moving pen and rolling strip chart. While great strides have been made in perfecting the reliability of these devices, the inherent disadvantage of moving parts has not been overcome. Furthermore, the security measures provided for such devices are far from tamper proof. A shipper need only break the external security seal on such device to replace the strip chart with a falsified chart. Upon resealing the device, the receiver is unable to detect any violation of the recorder unit.

It has been suggested that temperature data of the type described above can be remotely recorded by an electronic device. The implementation of such a recorder has been heretofore impractical, because of the ease with which one well versed in electronics can defeat the data integrity of such an electronic system. Therefore, a need exists for an electronic remote environmental monitoring system which has redundant safeguards to protect the integrity of the stored data.

DISCLOSURE OF THE INVENTION

It is an object of the present invention to remotely monitor a measurable condition and to store the measurements electronically.

It is a further object of the present invention to provide electronic safeguards for stored data.

It is yet another object of the present invention to minimize the power requirements of an electronic remote environmental monitor system.

The invention achieves these and other objects which will become apparent from the description which follows, by providing an electronic measurement, data storage and readout system utilizing a programmable processor and controller to manipulate data measurements from a transducer. Other means are provided for electronically safeguarding the stored data.

In the preferred embodiment means are also provided for reading out the data directly to a dedicated printer for producing graphical representations of the data and for converting the data to frequency-shift keyed signals which can be transmitted over telephone lines to the dedicated printer.

In the preferred embodiment the elements of the system which comprise the remote monitoring unit are contained in a case having external means for securing the recorder. The case also preferably contains means for identifying the recorder unit.

The preferred embodiment describes the system as being adapted for measurement of temperature and time. However, it is to be understood that the inventive concepts disclosed herein can be applied for the measurement and recording of a variety of environmental and other conditions which can be converted to electronic signals.

BEST MODE FOR CARRYING OUT THE INVENTION

In the preferred embodiment of the invention, three separate components are provided: a recorder unit for recording temperature measurements in a memory; a dedicated printer for plotting the temperature measurement on a paper chart; and a deployment station for testing the recorder unit and for preparing the recorder unit for redeployment.

Figure 1:
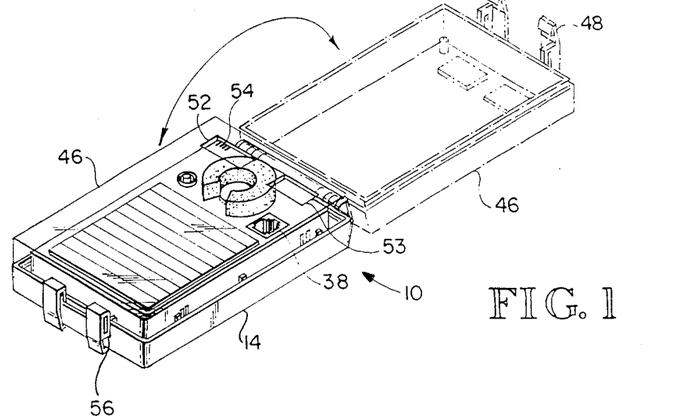
FIG. 1 is an isometric view of the recorder unit of the present invention.

In FIG. 1, an electronic recorder unit, in accordance with the present invention, is generally indicated at reference numeral 10. The electronic components of the recorder primarily reside on a circuit board 12 shown in FIG. 2. A schematic diagram of the electric circuit for the recorder unit is shown in FIG. 3.

Figure 2:
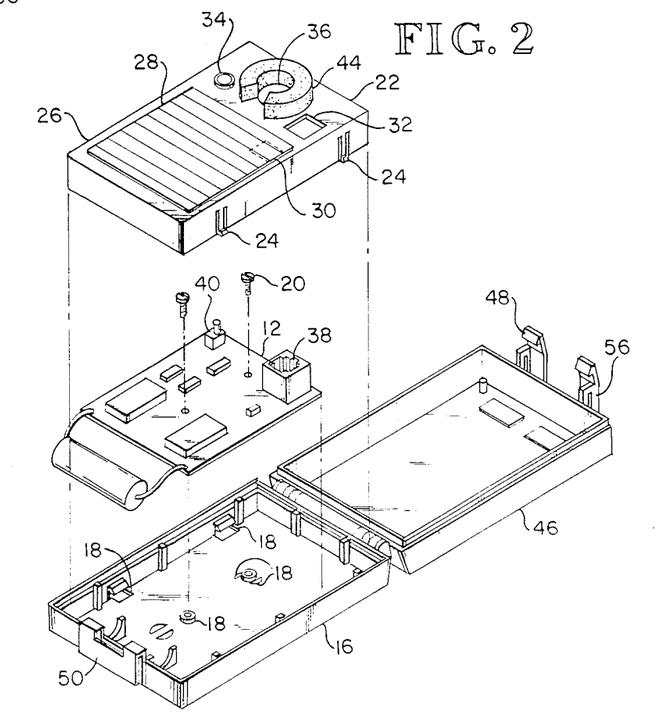
FIG. 2 is an exploded isometric view of the recorder unit of FIG. 1.
Figure 3:
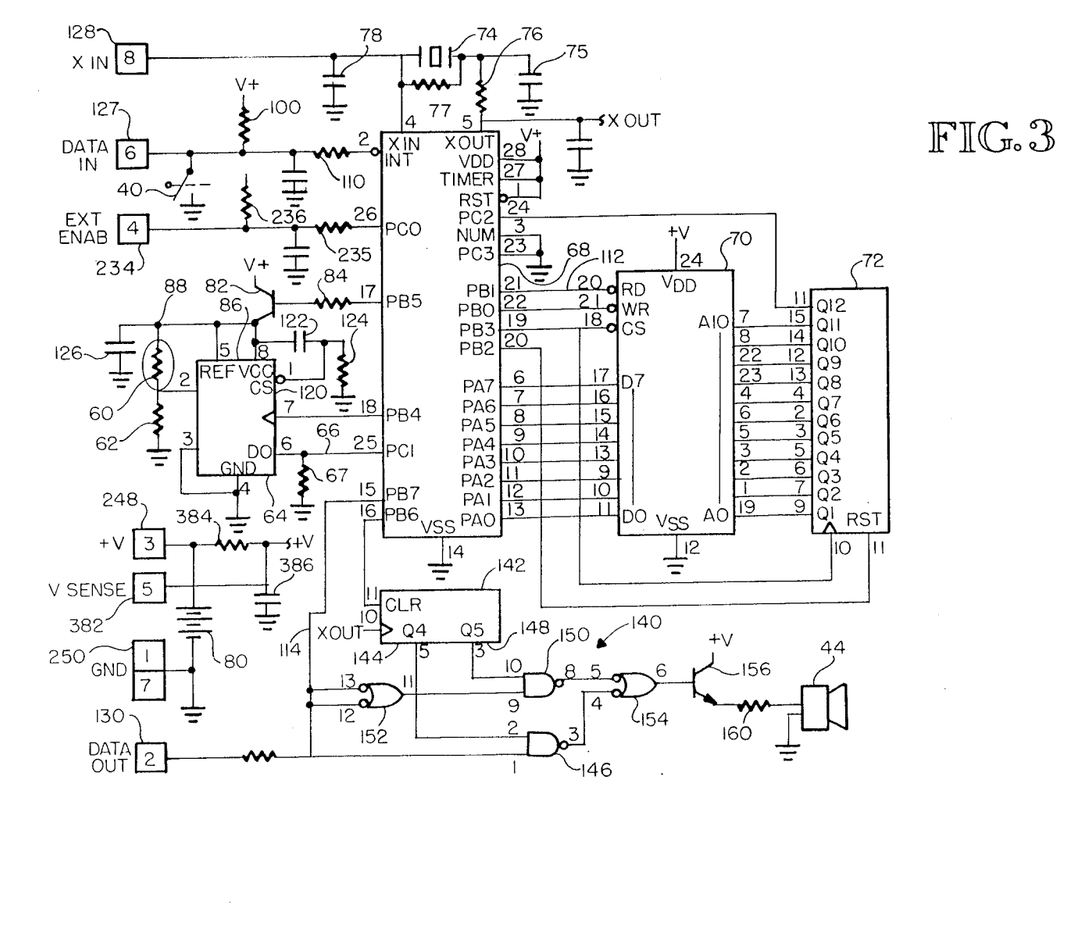
FIG. 3 is an electronic schematic of the recorder unit.

As shown in FIG. 2, the circuit board 12 and other components of the circuit are contained in a case 14. The case has a bottom 16 with airflow openings 18. The circuit board 12 can be secured to the bottom 16 by screws 20 or other means. The circuit board is protected by an inner cover 22 which is resiliently secured in a nested position within the bottom such as by four resilient fingers 24 which engage the underside of projections on the interior walls of the case. The inner cover provides a substantially planar writing surface 26 for a three page shipping notice 28 which attends the recorder unit 10 in transit. The inner cover 22 also has a secondary airflow opening 30 to provide access to the temperature sensor, described below. Openings 32, 34 and 36 are provided for an electrical connector 38, initiating switch 40 and speaker 44 respectively.

The inner cover 22 is enclosed by a substantially transparent outer cover 46. The outer cover is pivotally attached to the bottom 16 and has a latch 48 which is resiliently engaged by a spring-tab 50 on the bottom 16 when the outer cover is in the closed position as shown in solid lines in FIG. 1. FIG. 1 also shows the outer cover in its fully open position in phantom. The outer cover can be provided with an indentation 52 providing an area in which a bar code label 54 or other identifying means can be provided to indicate a serial number or other machine readable identifying number for the recorder unit 10. Preferably there is an adjacent indentation 53 defining an area in which the serial number of the unit can be permanently placed in human readable form, such as by etching.

In this preferred embodiment, the recorder unit is designed to measure the temperature of the local environment and to associate the measured temperatures with predetermined time intervals. In this way, an electronic record is made of the environmental temperature at the specific time intervals during the transit of the recorder unit.

One contemplated use of the recorder unit is for measuring the temperature of a cargo container during the shipment of fruits, vegetables or other temperature sensitive produce. The shipper would insert the recorder unit 10 in the cargo container with the produce and start the recording procedure by depressing the initiating switch 40 for approximately four seconds. The recorder unit will make temperature measurements at the selected time intervals for the duration of the shipment time or until the memory of the recorder is full. At that time, the data stored in the recorder can be readout from the recorder 10 through the electrical connector 38 or from the speaker 44.

To assure that the shipper does not tamper with the recorder after the recorder deployment has commenced the latch 48 is provided with openings 56 through which a security seal (not shown) can be threaded. As will become apparent from further description of the electronic circuit shown in FIG. 3, mere violation of the case 14 will not compromise the security of the measurements stored in the recorder because various electronic safeguards have been provided to prevent such violation.

FIG. 3 illustrates the preferred embodiment for the electronic circuit of the recorder unit 10. It is to be understood that other functionally equivalent electronic circuits are considered to part of the invention and that the circuit shown in FIG. 3 is a preferred embodiment of a variety of functionally equivalent electronic circuits. The circuit is provided with a transducer 60 which converts ambient temperature to an analog electronic signal. It has been found that a temperature-sensitive resistor, commonly known as a "thermistor" is suitable for this purpose. The thermistor is connected in series with a divider resistor 62 which causes a voltage drop across the thermistor. In this preferred embodiment, the transducer thermistor 60 has a value of 10K ohms and the divider resistor 62 has a value of approximately 25K ohms. The voltage output of the transducer is connected to an analog-to-digital (A/D) converter 64 which converts the analog output of the transducer to a series of digital pulses which appear at the output of the converter on line 66. A 100K ohm resistor 67 connects line 66 to ground to prevent the output of the A/D converter from drifting high such as in salt air environments.

Line 66 is connected to a central processing and controlling unit (CPU) 68 which provides data handling capacity for the electronic recorder unit. It has been found that a programmable microprocessor is most useful for this function. In this embodiment, a Motorola 146805F2 single chip, complementary metal oxide semiconductor, by Motorola, Chicago, Ill., CPU is preferred because of the low power drain characteristics of such a device. The CPU includes an internal MPU, EPROM and RAM. The CPU is connected to a RAM 70 to store the digital signals produced by the A/D converter. A 2 kilobyte, CMOS random access memory has been found to be useful for this purpose. The memory 70 is addressed by a conventional binary counter 72 which addresses the memory sequentially.

It is to be understood that the microcomputer comprising the CPU 68, RAM 70 and counter 72 is only one illustrated method for processing and controlling the digital signals from the A/D converter 64. Other methods such as discrete gating may be employed and are considered to be part of the invention.

The CPU 68 is driven by a resident clock pulse generator 74. The resident clock operates at a frequency of approximately 32.68 KHz. The following component values have been found to provides proper operation of the resident clock 74 when operating at 32.68 KHz and when overdriven at a higher frequency as will be described further below: capacitor 75, 150 pF; resistor 76, 10K ohms; resistor 77, 22M ohms; and overdrive capacitor 78, 22 pF.

The CPU is preferably programmed to make the temperature measurements at selected time intervals for storage in the memory 70. For example a preferred arrangement is for the CPU to instruct the transducer 60 and A/D converter 64 to make a temperature measurement every 15 minutes. The measurement is then stored in the memory 70. Each time a measurement is made, the counter 72 is incremented so that the measurement is stored in a different location in the memory. The arrangement shown is thus capable of storing approximately 2000 measurements.

Power is supplied to the circuit by a battery 80 which has been chosen as a single 4.5 volt battery to discourage pilfering of the circuit component. It has also been found that 4.5 to 3.0 volts, the voltage range of the battery during its useful life, is appropriate for operating the disclosed electronic devices.

It is highly desirable to minimize the power consumption of the circuit. As previously discussed, the CPU 68 and RAM memory 70 are CMOS devices which have inherently low power consumption characteristics. However, it has been found that the A/D converter and thermistor transducer 60 draw an excessive amount of current when operating continuously. Therefore, a transistor switch 82 has been provided to substantially reduce the current flow to the A/D converter 70 and transducer 60 between the selected time intervals when measurements are desired.

During the periods between the selected time intervals the A/D converter and the transducer are turned off by the transistor switch 82, placing the recorder unit in a low power mode. In the low power mode, the recorder unit consumes approximately 100 micro amps. The base of the transistor switch 82 is connected to the CPU 60 through a resistor 84 having a value of 30K ohms. The resistor serves to limit current flow to the CPU and can be selected to bias the transistor. The emitter of the transistor is connected to the battery. The collector is connected to the power supply pin 86 of the A/D converter. (Please note that the pin numbers for the described electronic devices have been provided at each device in small script numerals). The collector of the transistor switch is also connected to the high end 88 of the transducer 60 and divider resistor 62 pair. The CPU 68 is programmed to turn-off the switching transistor 82 between the selected, time intervals when no measurement is desired by holding the base high. In this way, the current flow to the A/D converter 64 and transducer 60 is minimized during low power mode periods. With this arrangement, it has been found that the recorder unit 10 has sufficient power to make multiple deployments without a battery charge. In each deployment, four measurements per hour for a period of up to 15 to 20 days can be made. The recorder unit has a shelf life of over one year when not recording.

As previously discussed, the shipper of the produce or other commodity with which the recorder unit 10 is shipped initiates the temperature recordings by depressing the initiating switch 40 and holding the switch for approximately four seconds. If the switch is depressed for less that four seconds, the CPU 68 instructs the speaker 44 to generate a tone indicating that the recorder unit is in a ready-to-record state. The CPU 68 utilizes low true logic at pin 2, therefore a pull-up resistor 100 is connected to the battery 80 to keep this input normally high. A resistor-capacitor pair 110 having values of 10K ohms and 330 pF is provided to limit external current flow to the CMOS CPU 68.

Depression of the initiating switch 40 pulls pin 2 low. This CPU is programmed to recognize a low signal at pin 2 as an indication to begin recording temperatures at the selected intervals if the recorder unit is in the armed and ready-to-record state and if the button is depressed for at least a selected interval, such as four seconds. The CPU is programmed so that the next time the initiating button 40 is depressed for four seconds the read line 112 to the memory 70 will be enabled (low signal) if at least three measurements have been made. The data is then readout serially on a data output line 114. However, the CPU 68 is not reinitialized to the ready-to-record state nor is the counter 72 reset by this procedure. The CPU is programmed to reset the counter 72 and write over the recorded data under a preset condition which will be described at a later point in this description. In this way, the data is electronically safeguarded and cannot be compromised by one who is unfamiliar with the system.

In this preferred embodiment, the counter 72 can only be reset and the CPU 68 reinitialized to the ready-to-record state if a default value signal appears on line 66 which connects the D/A converter 64 to the CPU 68. The converter is of a type which provides a default value on line 66 if the converter is receiving power at the power supply pin 86 but is disabled by a logical low signal at the chip select pin 120. It has been found that a National Semiconductor part number ADC0831CCN by National Semiconductor Corporation, Santa Clara, Calif., is suitable for this purpose. The power supply pin 86 is connected to the chip select pin 120 by a capacitor 122 and a resistor 124. In this preferred embodiment, capacitor 122 has a value of 0.1 micro Farad and resistor 124 has a value of 100K ohms. The capacitor and resistor are connected in series with the resistor connected to ground and the capacitor connected to the power supply pin 86. A capacitor 126, having the same value as capacitor 122 is connected between the high end 88 of the transducer and ground to prevent transient power spikes.

The chip select pin 120 is connected to the node between the capacitor and the resistor. The chip select pin 120 does not go low until the capacitor 122 is charged. The R-C time constant of this circuit is approximately 0.01 seconds. When the CPU 68 is driven by the clock pulse generator at 32.76 KHz, (i.e., a clock pulse every 0.00003 seconds, approximately), the A/D converter is enabled by the time the CPU 68 is ready to receive a data output on line 66. In this case, the measurement is stored in the memory 70 by the CPU 68. However, when the clock pulse generator 74 is overdriven by a substantially higher frequency, the CPU is also driven at the higher frequency. In this case, the capacitor 122 does charge sufficiently to bring the chip select pin 120 to a low state by the time the CPU 68 expects a data measurement on line 66.

The CPU 68 is programmed to recognize this condition and then accept external instructions from a data input terminal 127. The CPU can be instructed, among other things, to move to the ready-to-record state. New measurements cannot be stored in the memory 70 unless the recorder is reinitialized to the ready-to-record state and the recorder will not accept any such instructions unless it is overdriven at the second, higher frequency.

By utilizing the data protection technique described above, it is permissible to readout the data whenever the initiating switch 40 is depressed and after at least the three measurements have been made, because the recorder unit 10 is not reinitialized by depressing initiating switch 40. As previously stated, the digital data stored in the memory 70 is readout serially on data output line 114 whenever the initiating switch 40 is depressed for approximately four seconds and after at least three measurements have been made. The data can be electronically retrieved at the data out terminal 130 which is one of the electrical contacts of electrical connector 38 of FIGS. 1 and 2.

It has also been found to be desirable to provide an audible data output which may be transmitted over telephone lines. For this purpose, a simplified frequency-shift keyed (FSK) modulator is provided generally indicated at reference numeral 140. The FSK modulator utilizes a conventional binary counter 142 which is similar to the counter 72 used to address the memory 70. The fourth significant bit output 144 is used to divide the clock signal from the clock 74 by 16 to provide a clock frequency of approximately 1048 Hertz. This signal is fed to a two input NAND gate 146. The other input to the NAND gate is connected to the data output line 114. A modulated signal having a frequency of approximately 2048 Hertz appears at the output of the NAND gate 146 whenever a logical one appears at the input to the NAND gate.

The output for the fifth most significant bit 148 on the counter 142 divides the clock pulse from the clock pulse generator by 32 to provide a clock signal having a frequency of approximately 1028 Hertz. This signal is fed to a second NAND gate 150 which also has two inputs. The second input of the second NAND gate is connected to the data output line 114 by an inverter 152. The NAND gate 150 provides an output of 1028 Hertz whenever a logical low signal appears on the data output line 114.

The outputs of the NAND gates 146 and 150 are fed to an OR gate 154 having inverted inputs which isolate the NAND gates from one another and buffers their outputs to a driving transistor 156. The collector of the driving transistor is connected to the positive voltage from the battery 80. The emitter of the driving transistor is connected through a resistor 160 having a value of 470 ohms to the speaker 44 which is also shown in FIGS. 1 and 2.

The above described FSK modulator 140 and speaker 44 combination allows the data stored in the memory 70 to be readout over a conventional telephone for decoding by a suitably constructed modem. The CPU 68 operates at a baud rate of 343 so that six cycles of logical true signals will be produced by the NAND gate 146 and three cycles of the logical false signals will be produced by the NAND gate 150 for each true and false output signal appearing on output data line 114, respectively. This redundancy ensures that the FSK signal can be demodulated in the event that noise or other distortion appears on the telephone lines used to transmit the FSK signal.

It should be noted that the audible output from the speaker 44 is only used to transmit data when the initiating switch 40 is depressed for approximately four seconds. Thus, the entire electrical circuit shown in FIG. 3 is being driven by the clock pulse generator 74 operating at a frequency of approximately 32.768 KHz. At this frequency and associated baud rate it takes approximately 70 seconds to off-load a fully loaded memory 70. When the clock pulse generator 74 is over driven by an external clock pulse signal on the external clock input line 128, a faster data readout will occur. If the external clock pulse signal on line 128 is approximately 1 MHz, CPU 68 will operate at approximately 9600 baud and will off-load the data onto the data output line 114 in approximately two seconds. The FSK modulator cannot be used to transmit data over the telephone lines when the clock pulse generator 74 is over-driven because the frequency of the data output will be too high for proper transmission over telephone lines and for proper operation of the speaker.

The Dedicated Printer

Figure 4A:
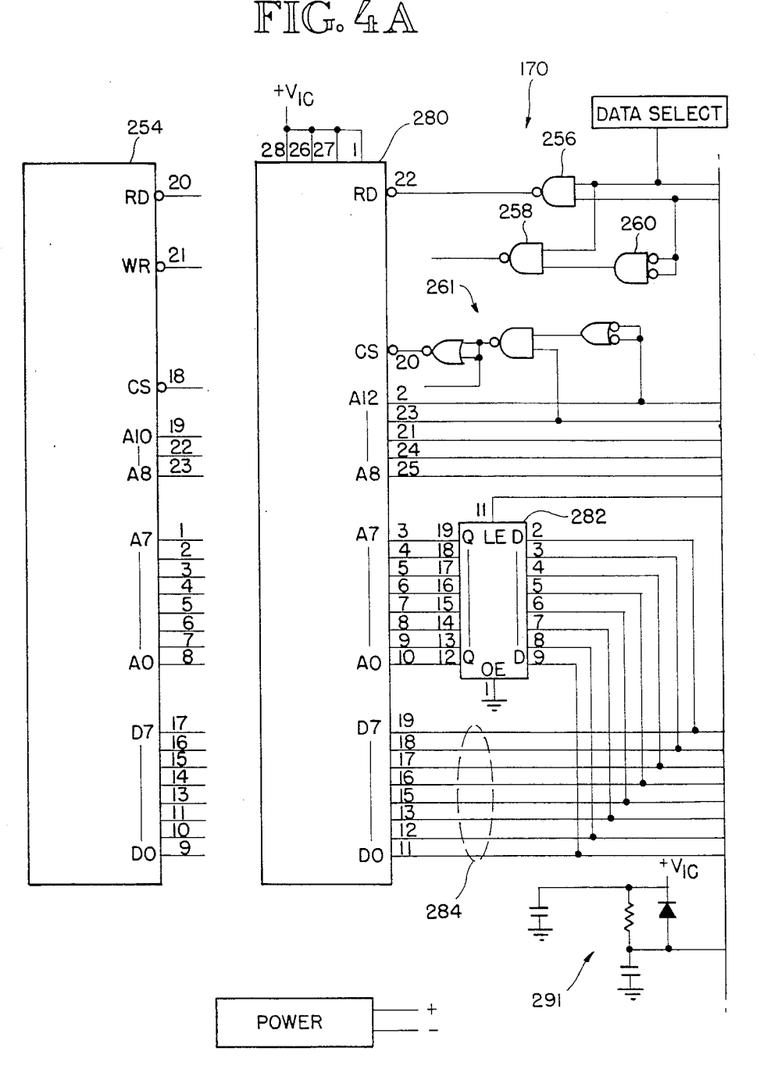
FIGS. 4a and 4b comprise a schematic representation of a dedicated printer for the recorder unit shown in FIGS. 1 through 3.
Figure 4B:
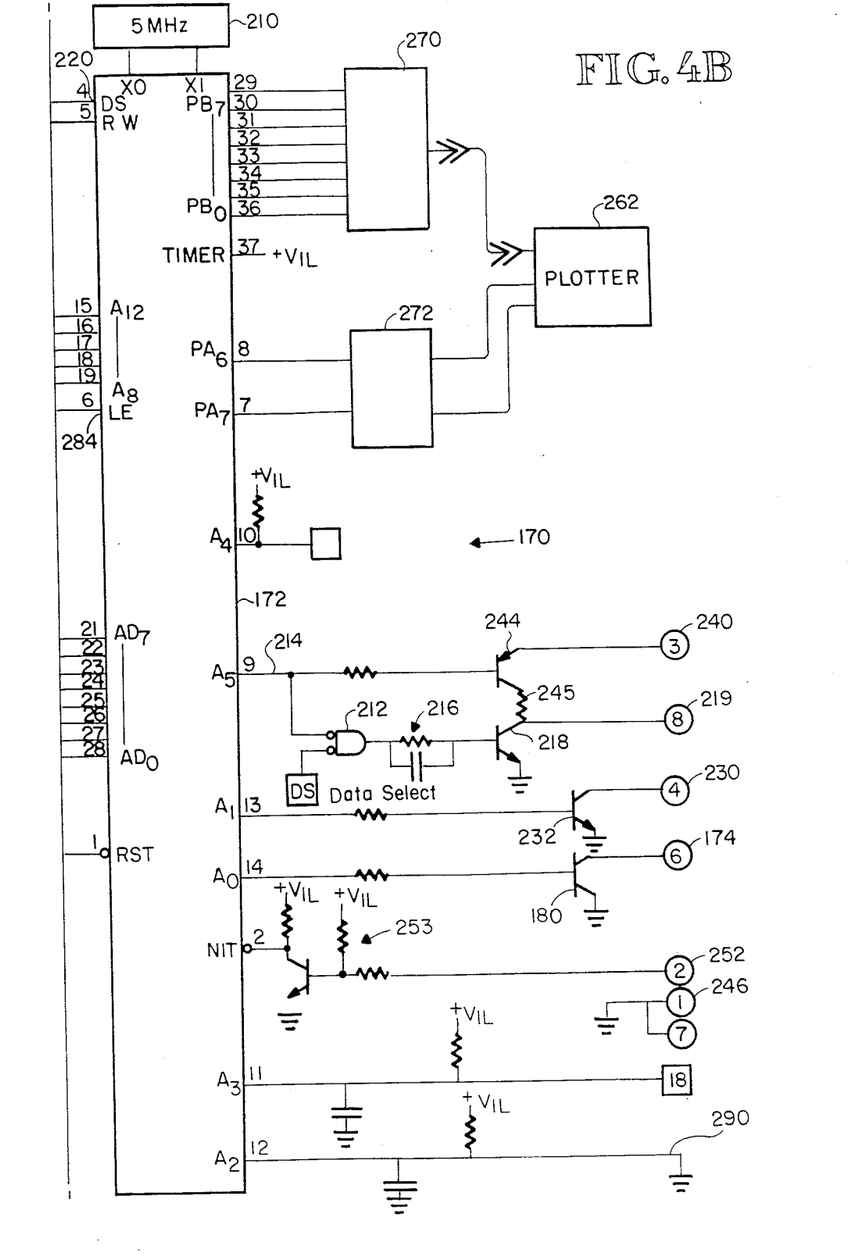

A device including a circuit for overdriving the clock pulse generator 74 and for printing the data in readable form is shown in FIGS. 4a and 4b. FIGS. 4a and 4b are schematic representations of a circuit for a dedicated printer for use with the electronic recording unit 10. The housing for the dedicated printed is not considered to be part of the inventive concept of the present invention and is therefore not shown.

The circuit diagrams shown in FIG. 4a and 4b embody one version of a dedicated printer 170 which can be used to interface with the electronic recorder unit 10. The dedicated printer has an output connector which is designed to interface with electrical connector 38 of the electronic recorder unit 10. The terminals of the connector on the dedicated printer are represented by circular terminals on the right-hand side of FIG. 4b. FIG. 4a is the left-hand side of the circuit. FIG. 4b is the righthand side of the circuit. Note that the pin numerals for the various electronic components have been included in small script next to the the pins of the individual devices.

Referring to FIG. 4b, the dedicated printer has an eight bit central processing unit, CPU, 172 which can be interfaced with the CPU 68 of the electronic recorder unit. The printer CPU can transmit information and instructions to th-e the electronic recorder unit 10 through printer output pin 174. The printer output pin 174 connects with the data input terminal 127 of the electronic recorder unit. The printer CPU 172 supplies signals to the base of the data output transistor 180. A logical true pulse from the printer CPU 170 to the transistor 180 connects the printer output pin 174 and the recorder data input pin 178 to ground thereby changing the state of the input to the recorder unit CPU 68. In this way, information can be loaded into the internal random access memory of the recorder unit CPU 68 by the printer CPU 172.

The printer CPU is driven by a 5 MHz clock 210. The printer clock frequency is internally divided by 5 to a frequency of 1 MHz and is applied to an AND gate 212 through a high-frequency clock input line 214. A resistor capacitor parallel pair, generally indicated by reference numeral 216 conditions the output of the AND gate for application to the base of a transistor 218. The collector of the transistor 218 is connected to a high-frequency clock output pin 219 which connects to the external clock input line 128 of the recorder unit 10. The other input of the two input AND gate 212 is connected to a data select pin 220 of the printer CPU 172 so that application of the high-frequency clock signal to the external clock input line 128 in FIG. 3 can be selected by the printer CPU appropriately. Therefore, the printer CPU can be programmed to instruct the recorder unit to off-load data stored in the recorder unit memory 70.

To inform recorder unit CPU 68 that it is connected to the dedicated printer 170 an external enable signal is provided at external enable output pin 230. In a fashion similar to the data input signal on the data input pin 174 an external enable transistor 232 has its base emitter junction forward biased by the printer CPU to bring the external enable pin 234 on the recorder to a low condition. A resistor-capacitor pair 235, similar to resistor-capacitor pair 110 is provided to limit current flow. The recorder unit CPU 68 is programmed to recognize that a low input on the external enable pin 234 indicates that the dedicated printer is connected. The external enable pin 234 utilizes a pull-up resistor 236 to keep the external enable pin 234 of the recorder unit 10 normally high when external enable pin 234 is not enabled.

Battery voltage from battery voltage pin 240 is connected to a battery voltage switching transistor 244 whose base is connected to the high-frequency clock output line 214. The potential difference between battery voltage pin 240 and the ground terminal 246 indicates the voltage of the battery 80 of FIG. 3. A resistor 245 connects the collector of switching transistor 244 to the collector of transistor 218. In this way, the voltage output of the recorder unit battery powers the clock overdrive 1 Mhz signal which appears at the high-frequency clock output pin 219. Battery voltage pin 240 and ground terminal 246 of the dedicated printer 170 interconnect with the recorder unit voltage pin 248 and the recorder unit ground terminal 250.

To read data out from the recorder unit 10 the data output terminal 130 of the recorder unit is connected to a conventional level shifting inverter circuit, generally indicated by reference numeral 253, which converts the high-true data output signal from the recorder unit CPU 68 to low-true data input signal for the printer CPU 172.

The dedicated printer CPU 172 converts the serial output from the electronic recorder unit to a parallel data input. The printer CPU enters this data onto a random access memory 254 shown in FIG. 4a. The random access memory is instructed to read or write by the CPU 172 through gates 256, 258 and 260. The arrangement of these gates is entirely conventional. The data can then be read from the random access memory 254 and processed by the printer CPU 172 to drive a plotter 262 which produces a paper chart 264 shown in FIG. 5. The printer CPU enables the random access memory 254 through chip select gates, generally indicated at reference numeral 261. The arrangement of these gates is entirely conventional.

Figure 5:
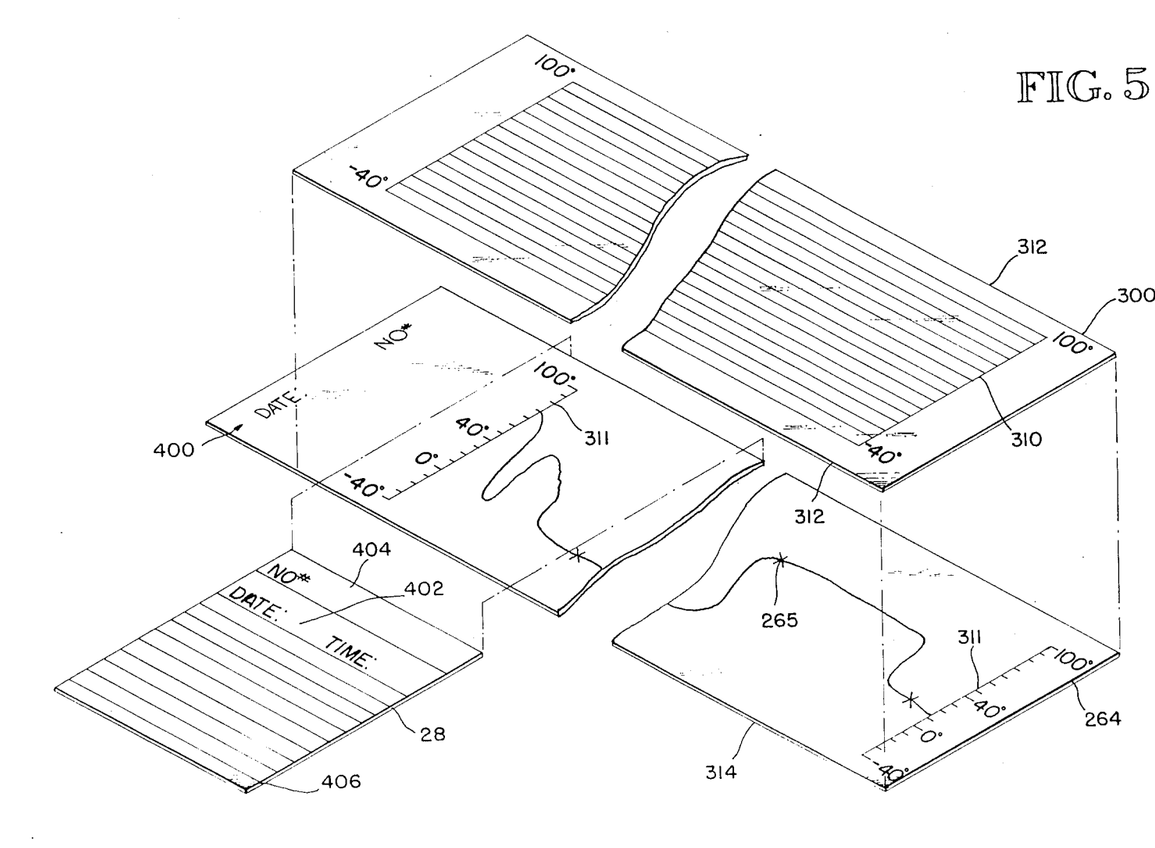
FIG. 5 is an isometric view of a strip chart which is produced by the dedicated printer of FIG. 4a and 4b with an overlay superimposable thereon.

The chart has vertical axes labeled in temperature and an unlabeled horizontal axis which represents time. The cross marks 265 indicate days (96 fifteen minute time intervals). The plotter 262 is entirely conventional. It has been found that a plotter manufactured under the trade name ALPS, ALPS Electric (U.S.A.), Inc., printing on 4.5 inch wide paper is satisfactory for this purpose.

To drive the plotter, the CPU 172 is connected to an octal driver 270 to increment the plotter motor. The plotter pen is moved from a paper contact to a paper non-contact position by plotter pin circuitry 272 which is functionally represented by a box. This plotter circuitry is entirely conventional and is supplied with the ALPS plotter.

The program for driving the printer CPU 172 is stored in an erasable, programmable, read-only memory 280. A latch enable output 284 on the CPU 172 holds the output values of a multiplexer 282 while the data lines 284 are used for data transmission. The operation of the multiplexer is entirely conventional. The printing routine which is controlled by the program stored in the EPROM 280 is initiated by depressing the printer commence switch 290 shown in FIG. 4a. The printer CPU instructs the EPROM 280 to read by way of gates 256, 258 and 260. The EPROM is enabled by gates generally indicated reference numeral 261. The circuit generally indicated at reference numeral 291 is a conventional power on reset circuit.

In the preferred embodiment, the printer is programmed to off-load the data from the recorder unit onto the printer random access memory 254. It is to be remembered that by overdriving the recorder unit clock pulse generator 74 the data is off-loaded to the dedicated printer 170 at a high rate of speed (about baud 9600) which takes approximately two seconds. The printer CPU 172 instructs the plotter 262 to print the data which is now stored in the printer random access memory 254. The EPROM 280 also contains instructions for printing vertical temperature scales 311 which form end boundaries for the chart. The temperature scales are graduated in degrees. Other information can also be printed.

A substantially transparent overlay 300, shown in FIG. 5 is provided to give a quick visual check of the temperatures which have been encountered by the recorder unit 10 and printed on the paper chart 264 by the dedicated printer plotter 262. The individual horizontal bands 310 correspond to temperature markings on the vertical temperature scale 311 and can be color coded so that one unfamiliar with the system can quickly determine if the plotted temperatures are within a desirable range. For example, three different colors are used to indicate desirable, marginally desirable and undesirable temperature ranges, respectively. The edges 312 of the overlay align with the edges 314 of the paper chart to facilitate proper positioning of the overlay.

It is to be remembered that the recorder unit can be off-loaded to the printer 172 through the speaker 44 over a telephone line and complementary FSK demodulator to the data input pin 178 of the dedicated printer 170. However, the recorder unit will off-load at the slower baud rate of 343 (approximately 70 seconds to off-load) and is not reinitialized. The dedicated printer CPU 272 can be programmed to reinitialize the recorder unit after the data is off-loaded if it is so desired but only if the recorder unit is physically connected to the dedicated printer.

THE DEPLOYMENT STATION

Figure 6:
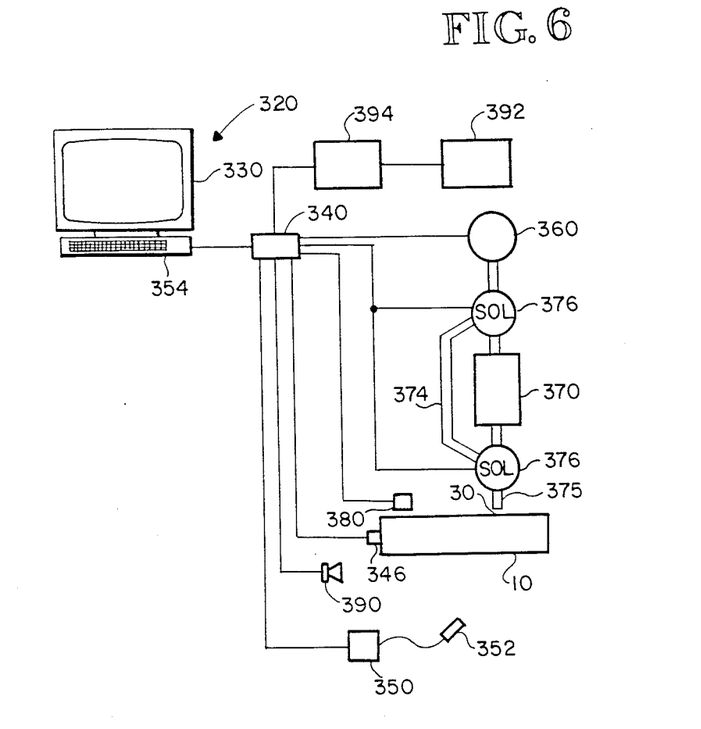
FIG. 6 is a block diagram of a deployment station for the recorder unit of FIGS. 1-3.

FIG. 6 shows a deployment station, generally indicated by reference numeral 320, which is used in addition to the dedicated printer 170. The deployment station tests the recorder unit 10 and initializes the recorder unit by instructing the recorder unit CPU 68 to begin recording temperatures when the recorder unit initiating switch 40 is depressed for four seconds. The deployment station preferably performs these functions after the data in the recorder unit has been read out and printed, by the dedicated printer 170. Typically, the dedicated printer 170 is not programmed to reinitialize the recorder unit. The deployment station uses a personal computer 330 and an interface circuit 340 to interface with the recorder unit 10 through a connector 346. The personal computer is programmed to off-load data from the recorder unit 10 through the interface circuit board 340 and reinitialize the recorder unit if these functions have not already been performed by the the dedicated printer 170. To reinitialize the recorder unit, the personal computer is programmed to generate the 1 MHz second frequency signal which is recognized by the recorder unit in the manner previously described, as an authorization to accept instructions on the recorder unit data input terminal 127. Preferably, the recorder unit CPU 68 is also programmed to accept external instructions only if the recorder unit external enable pin 234 is held low during transmission of the external instructions and when the clock pulse generator 74 is overdriven at the second 1 MHz frequency. This allows the deployment station to instruct the recorder unit to move to the ready-to-record state (or any other state if it is so desired) in preparation for redeployment into the field. The deployment station is thus capable of changing any of the programmed functions of the recorder unit 10. For example, the operator of the deployment station can, through the keyboard 354, reprogram the recorder unit CPU 68 to change the selected time intervals for the taking of measurements. The operator could also program the recorder unit to make less than a full memory 70 worth of temperature recordings if the trip is expected only to last a few days. Other programming possibilities are possible. The recorder unit, however, will only accept such instructions if the clock pulse generator 74 is overdriven at the 1 MHz second frequency as previously discussed. It is believed that one unfamiliar with the system would be unable to circumvent this electronic security scheme because both the program steps followed by the CPU 68 and their interaction with the hardware embodied in the R-C circuit 122, 124 must first be understood.

The deployment station performs a variety of other functions which prepare the recorder unit 10 for redeployment into the field. Specifically, the deployment station performs the following additional functions: check recorder unit battery 80 voltage for a value within an allowable range (voltage is sensed between recorder unit voltage pin 248 and recorder unit ground terminal 250); check recorder unit current consumption for a value within an allowable range (current is sensed between recorder unit voltage pin 248 and recorder unit current sense terminal 382); test and store transducer 60 calibration data (output of transducer 60 measured at data out terminal 130); check on board memory of the recorder unit CPU 68 for proper operation (conventional sum check with recorder unit CPU 68 driven by deployment station through recorder unit data input pin 178); test speaker 44, initiating switch 40 and FSK modulator 140 for proper operation; and record recorder unit identifying number from bar code label 54. The above described additional functions and the deployment station devices for the performance of these additional functions are more fully described below.

A conventional bar code reader 350 having a reader wand 352 is connected to the interface circuit 340 to read the bar code 54 from the outer cover 46 of the recorder unit. The personal computer stores and correlates this identifying code with the data off-loaded from the recorder unit memory if the recorder unit has not previously been reinitialized by the dedicated printer 170, along with shipping information typed into the personal computer through the keyboard 354. The identifying code and shipping information can also be introduced into the memory 70 of the recorder unit CPU 68 through the connector 346.

The deployment station also has a blower 60 electrically controlled by the personal computer 330 through the interface circuit 340 for blowing ambient air and cooler air onto the transducer 60 through the opening 30 on the inner cover 22 of the recorder unit for testing the calibration of the transducer. The output calibration signals produced by the transducer are entered into the memory 70 of the recorder unit on the data input pin 178 (FIG. 3) which is accessed by the connector 346. This calibration data can later be used by the dedicated printer 170 to normalize the temperature plot on the paper chart 264 (see FIG. 5) when the data is off-loaded. The data can also be used to determine if the response of the transducer is within a desired range. In a preferred calibration test, ambient air is focused on the transducer 60 followed by cooler air at approximately 10° F. below ambient temperature. If the change in temperature measured by the recorder unit 10 is not at least 5° F. within 10 seconds of the temperature change, the transducer is considered to be defective. In the above preferred calibration test, cool air is produced by feeding a vortex tube 370 with pressurized air from the blower 360. Ambient air is be supplied by bypassing the vortex tube through a passage 374 controlled by valves 376. The valves are electric solenoid operated and are electrically connected to and energized by the interface circuit 340 which is controlled by the personal computer 330. The cool or ambient air is focused on the opening 30 by a tube 378.

The speaker 44, FSK modulator 140 and initiating switch 40 of the recorder unit 10 can also be tested by the deployment station 320. A solenoid operated plunger 380 is electrically connected to the printed circuit board 340 which is controlled by the personal computer 330. The solenoid operated plunger 380 is positioned to operate the initiating switch 40 of the recorder unit. As previously stated, the speaker 44 generates a tone which is indicative of the state of the recorder unit (i.e., unarmed, armed and ready to record, recording or read out) when the initiating button 40 is depressed for less than four seconds. The personal computer 330 instructs the plunger 380 to depress the initiating switch 40 for a period of less than four seconds. A microphone 390 converts the audible output of the speaker 44 to an electrical signal which is received by the printed circuit board 340 for analysis by the personal computer 330. The personal computer determines if the frequency output of the speaker and FSK modulator are within allowable tolerances. The current drain of the recorder unit 10 is also tested by the deployment station 320.

The connector 346 is provided with pins to interface with a current sense terminal 382 on the recorder unit 10 (see FIG. 3). A resistor 384 and capacitor 386 pair are provided wherein the nodal point therebetween is connected to the current sense terminal 382. The personal computer 330 measures the current drain between the recorder unit voltage check pin 248 and the recorder unit current sense terminal 382 to see if the current drain of the recorder is within an allowable range.

A conventionally constructed telephone modem 392 and complementary FSK demodulator 394 are provided for demodulating FSK signals produced by the recorder unit FSK modulator 140 and transmitted over telephone lines to the deployment station. The output of the demodulator is connected to the interface circuit 340 for input to the personal computer 330.

In the above described scenario, only the operator of the deployment station is the lessor of the recorder units 10 and only the lessor has the capability to reinitialize the recorder units 10 through the deployment station 320. Because of this, the deployment station can perform an important, independent record keeping service for the lessees of recorder units.

The deployment station 320 is programmed to store the data from many recorder units 10 even though dedicated printers 170, in the possession of lessees have already printed out the stored data. This provides an independent library of stored data which can be compared to the paper chart 264 plots for verification at any time. Such verification is believed to be particularly valuable.

In order to match a data output stored in the deployment station 320 with an individual recorder unit 10 and a paper chart 26 the following features are provided. As previously discussed, the identifying, code and other shipping information is stored in the recorder unit memory 70 (along with calibration data) by the deployment station 320. It has been found that by programming the recorder unit CPU 68 to read out the identifying code and the Julian date of deployment from the deployment station with the stored temperature measurements, the paper chart 264 can be uniquely identified and matched with the readout data stored in the deployment station 320.

To document the identifying code and deployment data, the recorder unit 10 instructs the printer 170 to print this information on a header 400 of the paper chart 264. The shipping notice 28 can also be attached to the paper chart as described below.

The shipping notice 28 has a space 402 for the deployment date and a space 404 for the recorder unit identifying code. The shipping notice is preferably signed at the bottom 406 by the shipper for authentication purposes. The shipping notice is also preferably a triplicate document and has an adhesive strip on the back of the last page for adherence to the paper chart 264. A trip number and other identifying information may also be recorded on the shipping notice and entered into the recorder unit memory 70 by the deployment station operator if such information is known at the time of deployment.

It is contemplated that in one version of the invention the recorder unit 10 and a dedicated printer 170 would be leased to a lessee (i.e., a shipper or produce receiver). The lessor would have the only redeployment station for the system. Furthermore, the dedicated printer would not be programmed to reinitialize the recorder unit (i.e., instruct the recorder unit CPU 68 to begin temperature measurement when the initiating button 40 is depressed). Only the redeployment station would be provided with this feature embodied in the program resident in the personal computer 330. Thereafter, the lessee would return the recorder unit 10 to the lessor to reinitialize and prepare the unit for transit.

In a typical life cycle, the recorder unit, dedicated printer and deployment station interact as follows. The recorder unit is initialized (instructed to begin recording when initiating switch 40 is depressed and held for four seconds) and tested by the lessor at the deployment station. The deployment station operator enters the recorder unit identifying code in the space 404 and the date of deployment in the space 402 provided on the shipping notice 28. The shipping notice is then affixed to the recorder unit inner cover 22. The recorder unit is then mailed or otherwise delivered to the shipper. The shipper fills out other relevant information on the notice and signs the notice at the bottom 406. The shipper then starts the recorder recording by depressing initiating switch 40. The outer cover 46 is then closed and preferably sealed and the recorder is placed in the cargo compartment with the cargo. The receiver-lessee retrieves the unit 10 from the cargo compartment at the end of the transit.

If the receiver-lessee has a dedicated printer 170, the seal if broken, the case opened and the recorder unit is connected thereto. The button 290 is depressed to offload the recorder memory 70 into the printer memory 254. The printer then prints out the paper chart 264 for analysis by the receiver-lessee with or without the aid of the overlay. The recorder unit 10 is then returned (by mail) to the lessor for testing and reinitialization prior to redeployment to another (or the same) lessee.

If the receiver-lessee does not have a dedicated printer 170 as described above, the data stored in the recorder unit memory 70 can be read out over a conventional telephone by depressing the initiating switch 40 and producing audible frequency key shifted signals which are demodulated by the demodulator 394 at the lessor's deployment station 320. The data output is displayed visually on the personal computer 330 and can be analyzed and verbally reported to the receiver-lessee by a deployment station operator. The receiver lessee then delivers (by mail) the recorder unit to the lessor so that the recorder unit can be redeployed.

In addition to the above described procedure, the recorder unit, upon receipt by the receiver from the shipper, can be sent by mail to the lessor for printout on a dedicated printer 170 at the lessor's place of business. The lessor then sends the paper chart 264 temperature plot to the lessee. This method would only be used where the lessee-receiver does not immediately need the temperature history of the shipped cargo.

It will be appreciated that other variations and embodiments of the invention are contemplated. In particular, the use of transducers for measuring conditions other than temperature are specifically contemplated.

These additional embodiments have the same inventive characteristics as the preferred embodiment herein described. Therefore, the scope of the inventions is not to be limited by the above description, but is to be determined by the claims which follow.

We claim:

1. A low power consumption, electronic monitoring and data storage system for remote monitoring of a condition over a period of time, comprising:
a transducer for generating an analog output signal indicative of the condition to be monitored;
an electrically powered converter operatively associated with the transducer to convert the analog signals to digital signals;
a memory for storing the digital signals as stored data;
a clock pulse generator for generating clock signals at a first frequency;
processing and controlling means, responsive to the clock signals, for processing the digital signals and for controlling the memory so that the digital signals representing the monitored condition at selected intervals during the time period are stored in the memory at selected time intervals, including means for reading out the stored signals at a later time and to provide a historical report of the monitored condition wherein the processing and controlling means is responsive to an externally applied second clock frequency signal, substantially different from the first clock frequency, to initialize the system so that the system will not record data beyond a selected time period without being initialized by a designated user to control use of the system by other users.

2. The system of claim 1 wherein the converter has a disabling input to reset the output of the converter to a default value when the disabling input is activated and wherein the system has timing means for activating the disabling input when the converter is powered so that the default value is received by the processing and controlling means when the second clock frequency signal is applied to the processing and controlling means.

3. The system of claim 2 wherein the timing means has a capacitor operatively connected to the disabling input to activate the disabling input when the second frequency is substantially higher than the first frequency.

4. The system of claim 3, wherein the timing means comprises a resistor-capacitor series pair having a time constant selected to activate the disabling input when the second higher frequency signal is applied.

5. The system of claim 1 wherein the processing and controlling means is a programmable microcomputer having complimentary metal-oxide semiconductor architecture to minimize current consumption of the system and including power reducing means, controlled by the processing and controlling means, for reducing the power demand of the converter so that the power consumption of the system is substantially reduced between the selected time intervals.

6. The system of claim 1 including a dedicated printer having means for interfacing with the processing and controlling means and having means for generating the second frequency to activate the disabling converter input.

7. The system of claim 6 wherein the printer interfacing means also interfaces with the clock and wherein the frequency of the second frequency generating means is substantially greater than the first frequency and the clock is overdriven by the second frequency generating means.

8. The system of claim 6 wherein the dedicated printer has means for instructing the processing and controlling means to load data into the memory from the dedicated printer.

9. The system of claim 6 wherein the dedicated printer has means for producing a paper chart having a graphical representation of the stored digital signals versus time.

10. The system of claim 9 including a substantially transparent overlay sized for superimposition over the paper chart wherein the overlay has color coded sections to indicate data values outside of a desired range.

11. The system of claim 1 including a redeployment station having means for interfacing with the processing and controlling means and having means for generating the second frequency to activate the disabling converter input.

12. The system of claim 11 wherein the redeployment station has means for checking the calibration of the transducer.

13. The system of claim 12 wherein the redeployment station has a bar code reader.

14. A low power consumption, electronic monitoring and data storage system for remote monitoring of a condition over a period of time, comprising:
   a transducer for generating an analog output signal indicative of the condition to be monitored;
   an electrically powered converter operatively associated with the transducer to convert the analog signals to digital signals;
   a memory for storing the digital signals as stored data;
   a clock pulse generator for generating clock signals at a first frequency;
   processing and controlling means, responsive to the clock signals, for processing the digital signals and for controlling the memory so that the digital signals representing the monitored condition at selected intervals during the time period are stored in the memory at selected time intervals, including means for reading out the stored signals at a later time and to provide a historical report of the monitored condition wherein the processing and controlling means includes a data output line and wherein the processing and controlling means reads out the stored data serially as serial output data words on a data output line and wherein the system further includes a frequency shift keyed modulator operatively associated with the processing and controlling means, data output line and clock for receiving the serial output data words and for converting the serial output data words to frequency shift keyed signals, and means, associated with the modulator, for generating an audible signal therefrom, wherein the frequency shift keyed modulator produces six cycles of logical true signals and three cycles of logical false signals for each serial data output word from the processing and controlling means.

15. The system of claim 14 wherein the first frequency for the clock pulse generator is approximately 32.768 KHz and wherein the frequency shift keyed modulator has means for dividing the clock pulse by 16 and 32 to provide logical true and logical false signals of approximately 2048 Hz and 1028 Hz, respectively.

16. The system of claim 15 wherein the frequency shift keyed modulator comprises;
   a shift register, responsive to the clock signals and having a divide-by-16 output and a divide-by-32 output to divide the clock first frequency;
   a first two input NAND gate having one input connected to the divide-by-32 output and having the second input connected to the data output line through an inverter to provide the logical false frequency shift keyed signals;
   a second two input NAND gate having one input connected to the divide-by-16 output and having the second input directly connected to the data output line to provide the logical true frequency shift keyed signals; and
   a two input OR gate having one input connected to the output of the first NAND gate through an inverter and having the second input connected to the output of the second NAND gate through an inverter, the output of the OR gate being operatively associated with the audible signal generating means.

* * * * *